(12) United States Patent
Bowers et al.

(10) Patent No.: US 9,378,770 B2
(45) Date of Patent: Jun. 28, 2016

(54) SYSTEMS AND METHODS OF FACILITATING INSTALLMENT-BY-INSTALLMENT CONSUMPTION OF DISCRETE INSTALLMENTS OF A UNITARY MEDIA PROGRAM

(71) Applicant: Verizon and Redbox Digital Entertainment Services, LLC, Basking Ridge, NJ (US)

(72) Inventors: Paul Bradley Bowers, Winfield, IL (US); Joseph F. Ambeault, New York, NY (US); Brian F. Roberts, Dallas, TX (US)

(73) Assignee: VERIZON AND REDBOX DIGITAL ENTERTAINMENT SERVICES, LLC, Basking Ridge, NJ (US)

( * ) Notice: Subject to any disclaimer, the term of this patent is extended or adjusted under 35 U.S.C. 154(b) by 47 days.

(21) Appl. No.: 14/141,928

(22) Filed: Dec. 27, 2013

(65) Prior Publication Data

US 2015/0016800 A1    Jan. 15, 2015

Related U.S. Application Data

(60) Provisional application No. 61/846,603, filed on Jul. 15, 2013.

(51) Int. Cl.
*H04N 9/80* (2006.01)
*G11B 27/28* (2006.01)
(Continued)

(52) U.S. Cl.
CPC .............. *G11B 27/28* (2013.01); *G06F 3/0482* (2013.01); *G06F 3/0484* (2013.01); *G06F 3/04842* (2013.01); *G06F 17/30861* (2013.01); *G06Q 20/18* (2013.01); *G06Q 30/0255* (2013.01); *G11B 27/02* (2013.01); *H04L 65/601* (2013.01); *H04N 5/76* (2013.01); *H04N 7/163* (2013.01); *H04N 9/7921* (2013.01); *H04N 21/2387* (2013.01); *H04N 21/252* (2013.01);
(Continued)

(58) Field of Classification Search
CPC ........................... H04N 21/85; H04N 21/8549
USPC .................................................. 386/241, 278
See application file for complete search history.

(56) References Cited

U.S. PATENT DOCUMENTS

| 2007/0140662 | A1* | 6/2007 | Nunomaki | G11B 27/105 386/224 |
| 2009/0048939 | A1* | 2/2009 | Williams | 705/26 |
| 2010/0250665 | A1* | 9/2010 | Okamoto | H04N 5/85 709/203 |

*Primary Examiner* — Hung Dang
*Assistant Examiner* — Girumsew Wendmagegn

(57) ABSTRACT

An exemplary method includes a computer-implemented media service system 1) dividing a unitary media program into a plurality of contiguous segments, 2) forming, from the plurality of contiguous segments, a plurality of discrete installments of the unitary media program, and 3) providing an end user of a media service with installment-by-installment access to the plurality of discrete installments of the unitary media program. In certain examples, the method may further include the system providing an option for selection by the end user to access the unitary media program by way of a normal-access mode or an installment-access mode. The normal-access mode may be configured to facilitate a start-to-finish consumption of the unitary media program in a single playback session, and the installment-access mode may be configured to facilitate installment-by-installment consumption of the discrete installments of the unitary media program in multiple, discrete playback sessions.

21 Claims, 14 Drawing Sheets

(51) Int. Cl.
| | |
|---|---|
| *H04N 9/79* | (2006.01) |
| *G11B 27/02* | (2006.01) |
| *H04N 21/47* | (2011.01) |
| *H04N 21/482* | (2011.01) |
| *G06Q 20/18* | (2012.01) |
| *G06Q 30/02* | (2012.01) |
| *G06F 3/0484* | (2013.01) |
| *H04L 29/06* | (2006.01) |
| *G06F 3/0482* | (2013.01) |
| *H04N 21/472* | (2011.01) |
| *H04N 21/262* | (2011.01) |
| *H04N 21/458* | (2011.01) |
| *H04N 7/16* | (2011.01) |
| *H04N 21/2387* | (2011.01) |
| *H04N 21/6587* | (2011.01) |
| *H04N 21/25* | (2011.01) |
| *H04N 21/845* | (2011.01) |
| *H04N 21/8549* | (2011.01) |
| *H04N 5/76* | (2006.01) |
| *G06F 17/30* | (2006.01) |

(52) U.S. Cl.
CPC ... *H04N21/26258* (2013.01); *H04N 21/26283* (2013.01); *H04N 21/458* (2013.01); *H04N 21/47* (2013.01); *H04N 21/47202* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01)

SYSTEMS AND METHODS OF FACILITATING INSTALLMENT-BY-INSTALLMENT CONSUMPTION OF DISCRETE INSTALLMENTS OF A UNITARY MEDIA PROGRAM

RELATED APPLICATIONS

The present application claims priority under 35 U.S.C. §119(e) to U.S. Provisional Patent Application No. 61/846,603, filed Jul. 15, 2013. The contents of the provisional patent application are hereby incorporated by reference in their entirety.

BACKGROUND INFORMATION

There are diverse ways for people to find and consume media programs. For example, a person wanting to watch a media program such as a movie may utilize a video distribution service to access a digital copy of the movie through the service.

Such a user may want to watch a particular movie that has a duration that is too lengthy to conveniently fit into the schedule of the user. In order to watch the movie, the user could adjust his or her schedule to free up a long enough block of time within which the user can watch the entire movie. However, doing so may inconvenience and/or may not be preferred by the user.

Alternatively, the user could manually view the movie piecemeal, such as by manually pausing playback of the movie partway through the movie and manually resuming playback of the movie at a later time. However, such piecemeal viewing of the movie may diminish the experience of the user with the movie. For example, the manual pausing and resuming of playback of the movie may be inconvenient and/or unreliable. For instance, a media player device may stop tracking the position at which the movie was paused, and/or the user may forget the exact position at which the movie was paused.

Moreover, the user may get caught up in the emotion of the movie and allow the playback of the movie to continue longer than the user originally intended, which may lead to the user having sacrifice one or more other events on the user's schedule. In addition, even if the user manually pauses playback of the movie partway through the movie, when the user manually resumes playback of the movie at a later time, the content of the part of the movie that was previously viewed by the user may no longer be remembered or fresh in the mind of the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Examples of systems and methods of facilitating installment-by-installment consumption of discrete installments of a unitary media program are described herein. Installment-by-installment consumption of discrete installments of a unitary media program may be facilitated in any of the ways described herein. In certain examples, for instance, a media service system may 1) divide a unitary media program into a plurality of contiguous segments, 2) form, from the plurality of contiguous segments, a plurality of discrete installments of the unitary media program, and 3) provide an end user of a media service with installment-by-installment access to the plurality of discrete installments of the unitary media program, such as described herein. The installment-by-installment access to the discrete installments of the unitary media program may facilitate an installment-by-installment consumption, by the end user, of one or more of the discrete installments of the unitary media program.

Installment-by-installment access to and/or consumption of discrete installments of the unitary media program may be beneficial to one or more end users of a media service. For example, a user may prefer to watch a long-form media program, such as a lengthy movie, in small chunks at different times but may not want to deal with manually stopping and resuming playback of the movie over time. Exemplary systems and methods described herein may allow the user to conveniently and/or reliably access and consume discrete installments of the movie installment-by-installment, which may facilitate serialized consumption of the movie in discrete installments. Such serialized consumption of the movie may fit a schedule of the user, fit one or more preferences of the user, allow the user to "snack" on discrete installments of the movie, and/or facilitate the user experiencing a sense of anticipation, accomplishment, and/or satisfaction associated with serialized consumption of the movie in installments.

These and/or other benefits and/or advantages that may be provided by systems and methods described herein will be made apparent by the following detailed description. Exemplary systems and methods of facilitating installment-byinstallment consumption of discrete installments of a unitary media program will now be described in reference to the accompanying drawings.

Figure 1:
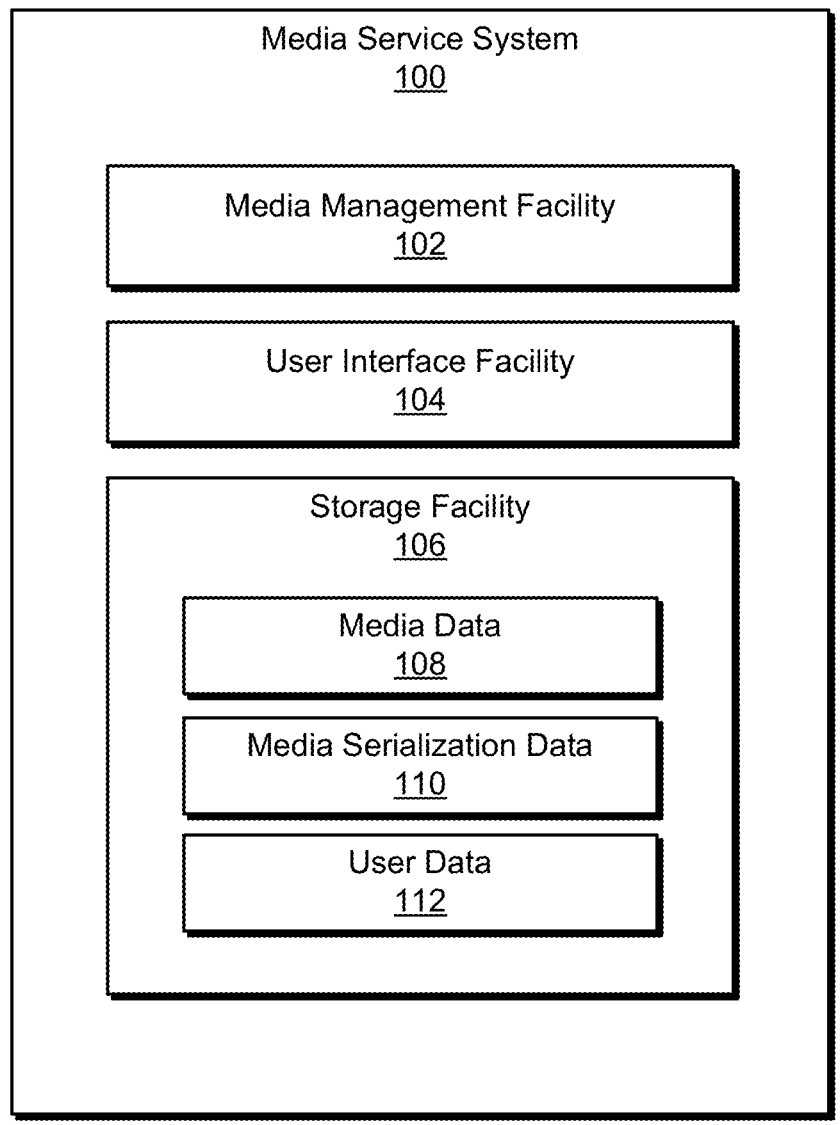
FIG. 1 illustrates an exemplary media service system according to principles described herein.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content. For example, system 100 may provide a media service through which end users of the service may access a unitary media program and/or discrete installments of the unitary media program, such as described herein. System 100 may be associated with (e.g., operated by) a provider of the media service ("service provider").

As shown, system 100 may include, without limitation, a media management facility 102, a user interface facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. For example, media management facility 102 may be divided into any number of facilities configured to provide any number of media management features (e.g., media serialization features) of a media service. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may be configured to store data generated and/or used by media management facility 102 and/or user interface facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media player device for presentation to a user.

Media data 108 may represent actual content of media content and/or information about the media content. For example, media data 108 may include metadata (e.g., information about genre, cast, title, playback duration, release date, chaptering information, etc.) and/or enriched metadata (e.g., user-defined tags, ratings, etc.) for the media content. In certain examples, media data 108 may represent information about media programs included in a repository of on-demand media content.

Storage facility 106 may include media serialization data 110 used and/or generated by media management facility 102. For example, media serialization data 110 may represent discrete installments of a unitary media program that are generated by media management facility 102. Additionally or alternatively, media serialization data 110 may represent an installment generation heuristic that specifies one or more factors upon which generation of discrete installments of a unitary media program may be based. Accordingly, media management facility 102 may use the installment generation heuristic to determine how to generate the discrete installments from a unitary media program, such as described herein.

Storage facility 106 may include user data 112 associated with one or more end users of a media service, such as data representing user profiles of the users. As described herein, such user profiles may specify information about users in relation to serialization of media programs and/or installment-by-installment access to discrete installments of media programs. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by media management facility 102 and/or user interface facility 104. In certain examples, data generated by media management facility 102 and/or user interface facility 104 may be stored permanently or temporarily to storage facility 106.

Media management facility 102 may be configured to perform one or more operations to serialize a unitary media program, which may include generating discrete installments of the unitary media program for installment-by-installment access of the discrete installments. For example, media management facility 102 may perform one or more operations to generate discrete installments of the unitary media program, such as by dividing a unitary media program into a plurality of contiguous segments and forming, from the plurality of contiguous segments, a plurality of discrete installments of the unitary media program. Media management facility 102 may be configured to generate discrete installments of a unitary media program in any suitable way, including entirely automatically without user input dedicated to the serialization of the unitary media program and/or based at least in part on user input (e.g., user input dedicated to the serialization of the unitary media program and/or user input that is incidental to user interaction with the media service). Examples of operations to generate discrete installments of a unitary media program will now be described.

Figure 2:
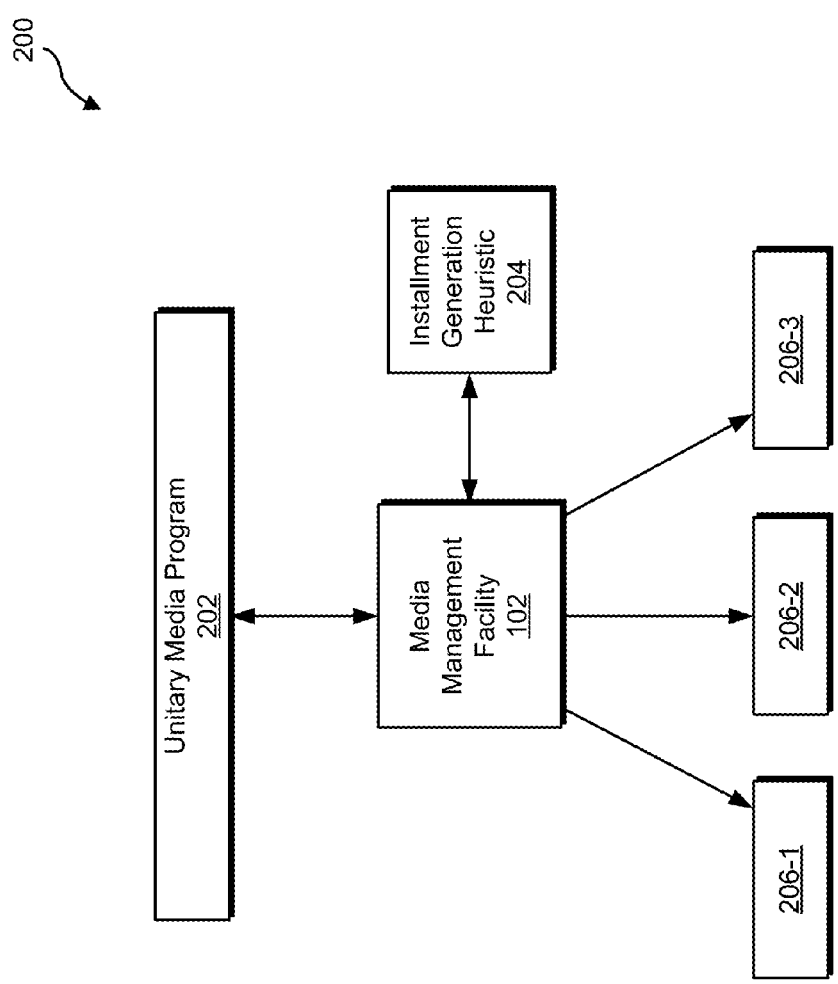
FIG. 2 illustrates an example of a generation of discrete installments of a unitary media program according to principles described herein.

FIG. 2 illustrates an example of a generation 200 of discrete installments of a unitary media program 202. As illustrated, media management facility 102 may have access to the unitary media program 202 and an installment generation heuristic 204. Media management facility 102 may use the installment generation heuristic 204 and the unitary media program 202 (e.g., information about the unitary media program 202 specified by media data 108) to generate discrete installments 206 (e.g., installments 206-1 through 206-3) of the unitary media program 202. The installment generation heuristic 204 may specify one or more factors to be considered by media management facility 102 in generating the discrete installments 206 of the unitary media program 202. The factors specified by the installment generation heuristic 204 may include any of the exemplary factors described herein and may be defined by an end user and/or a provider of a media service.

In certain examples, media management facility 102 may generate the discrete installments 206 by dividing the unitary media program 202 into a plurality of contiguous segments. This may include media management facility 102 identifying at least one division point within the unitary media program 202 based on at least one division factor specified by the installment generation heuristic 204 and splitting the unitary media program 202 at the identified at least one division point to divide the unitary media program 202 into the plurality of contiguous segments.

Media management facility 102 may identify one or more division points within the unitary media program 202 based on any suitable set of division factors specified by the installment generation heuristic 204. The division factors may be defined to promote identification of division points at playback positions that are well-suited for stopping and starting playback. For example, the division factors may indicate that the identification of division points is to be based on, without limitation, community-favored scenes (e.g., popular scenes among users of the media service), time that a user has available or wants to spend watching each discrete installment (e.g., small, medium, large installments, or a maximum length of playback time for an installment, etc.), natural breaks in scenes in the unitary media program (e.g., scene changes), camera view switches in the unitary media program, predefined chapters in the unitary media program, and/or any other attribute(s) of the unitary media program that may be used to identify division points within the unitary media program. Examples of identifying a division point based on one or more of these exemplary division factors will now be described.

In certain examples, media management facility 102 may identify a division point in relation to a popular scene of the unitary media program 202, the popular scene determined to be popular based on ratings provided by a community of users. For example, media management facility 102 may place the division point temporally before, after, or within the popular scene.

In certain examples, media management facility 102 may identify a division point based on a user-defined preferred length of a discrete installment of the unitary media program 202 (e.g., an amount of time that the user wants to spend watching a discrete installment). For example, the user may provide input indicating a preferred length of a discrete installment 206, and media management facility 102 may place the division point based on a resultant size of the continuous segments that will be created by splitting the unitary media program 202 at the division point. To illustrate one example, an end user of a media service may provide input indicating that the user prefers a "small," "medium," or "large" size of discrete installments, and media management facility 102 may identify, based on this input, a division point to create continuous segments that match the user-preferred length. Alternatively, the end user may provide input indicating a maximum length for discrete installments.

In certain examples, media management facility 102 may identify a division point based on a natural break in a scene in the unitary media program 202. For example, media management facility 102 may analyze the content of the unitary media program 202 and/or data descriptive of the unitary media program 202 to detect a natural break in a scene in any suitable way, such as based on audio and/or video parameters indicative of a natural break in a scene. For instance, media management facility 102 may detect a prolonged audio attribute (e.g., quietness) and/or a video attribute (e.g., a black or blank screen) indicative of a natural break in a scene.

In certain examples, media management facility 102 may identify a division point based on a switch in camera view in the unitary media program 202. For example, media management facility 102 may detect one or more attributes of video indicative of a change from one camera view to another camera view in the unitary media program 202 (e.g., by detecting pixel attribute changes above a predefined threshold that may indicate a change in camera view).

In certain examples, media management facility 102 may identify a division point based on predefined chapters in the unitary media program 202. For example, media management facility 102 may access and use chaptering information (e.g., chaptering information in media data 108) for the unitary media program 202 to identify a point at which a chapter ends or begins and position the division point relative to the end or beginning of the chapter.

In certain examples, media management facility 102 may identify one or more division points within the unitary media program 202 based on user input indicating the division points. For example, an end user or a provider of a media service may provide input to indicate a division point to be used by media management facility 102. In response, media management facility 102 may identify the division point to match the division point indicated by the user, which may include media management facility 102 generating data representative of the division point in response to the user input.

Figure 3:
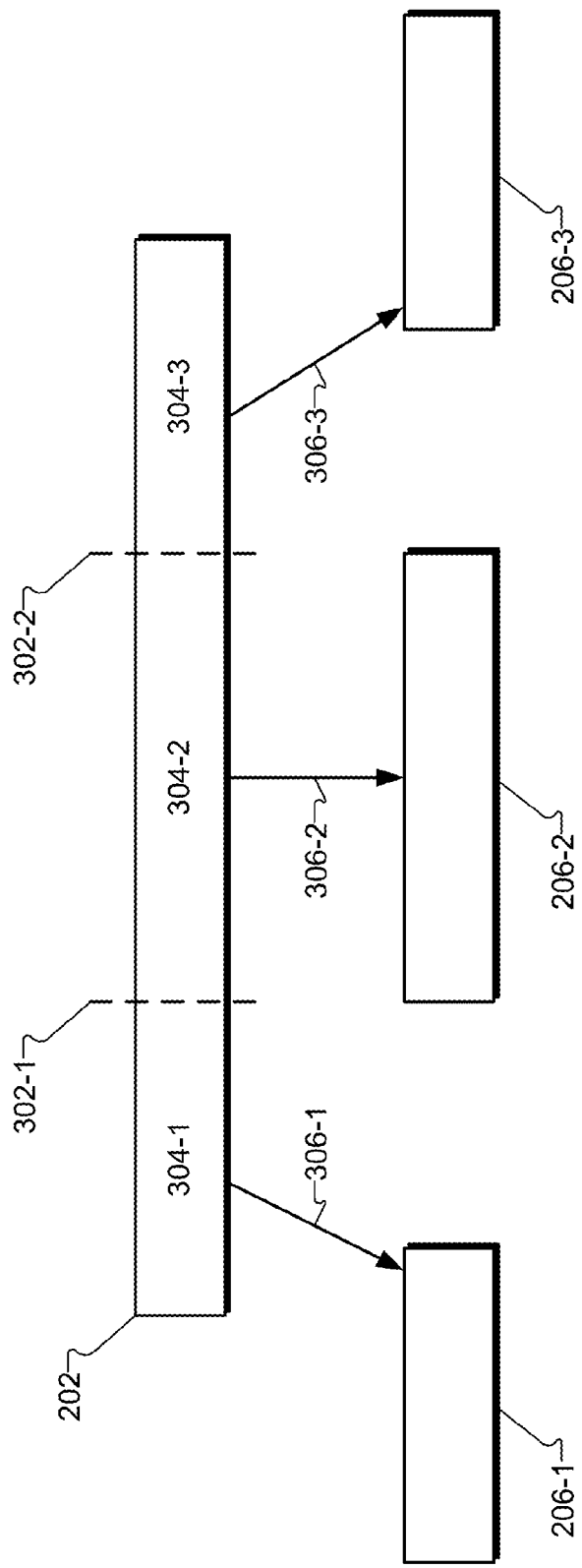
FIG. 3 illustrates relationships between a unitary media program, contiguous segments of the unitary media program, and discrete installments of the unitary media program according to principles described herein.

FIG. 3 illustrates division points 302 (e.g., division points 302-1 and 302-2) placed at positions within the unitary media program 202 to split the unitary media program 202 into contiguous segments 304 (e.g., continuous segments 304-1 through 304-3). As shown, the splitting of the unitary media program 202 into the contiguous segments 304 does not remove any content of the unitary media program. Accordingly, no content of the unitary media program 202 is omitted from the contiguous segments 304, and the contiguous segments 304 may be combined in sequential order to form the entire unitary media program 202.

Media management facility 102 may form, from the plurality of contiguous segments 304, the plurality of discrete installments 206 of the unitary media program 202. For example, media management facility 102 may form discrete installment 206-1 from contiguous segment 304-1 such that the discrete installment 206-1 contains the contiguous segment 206-1, as represented by arrow 306-1 in FIG. 3. Media management facility 102 may similarly form discrete installment 206-2 from contiguous segment 304-2 as represented by arrow 306-2, and discrete installment 206-3 from contiguous segment 304-3 as represented by arrow 306-3.

The forming of a discrete installment 206 may include media management facility 102 configuring the discrete installment 206 to be processed as a standalone unit in a media access operation. For example, the discrete installment 206 may be configured as a standalone unit to be individually processed as a unit in media access operations such as media discovery, access, and/or consumption operations. For instance, the discrete installment 206 may be configured as a standalone unit for download, streaming, and/or playback operations. The configuration of the discrete installment 206 may include media management facility 102 adding data structure and/or any suitable elements to the contiguous segment 304 to form the discrete installment 206 configured for standalone processing.

To illustrate, the forming of a discrete installment 206 may include media management facility 102 configuring the discrete installment 206 for standalone playback in an individual playback session. The configuration may include media management facility 102 adding data structure and/or any suitable elements to the contiguous segment 304 to form the discrete installment 206 configured for standalone playback in an individual playback session. For example, media management facility 102 may add data structure and/or elements associated with a launch and a termination of a playback session to the discrete installment 206 such that a playback of the discrete installment 206 in a playback session may include launching the playback session, playing back the contiguous segment 304 contained in the discrete installment 206, and terminating the playback session after the playback of the contiguous segment 304 concludes within the playback session. Accordingly, within the single, individual playback session, the continuous segment 304 contained in the discrete installment 206 may be played back from start to finish, without playback of any other continuous segment 304 of the unitary media program 202 occurring in the same playback session. In order to play back another continuous segment 304 of the unitary media program 202, a separate and individual playback session would be launched. Thus, in at least this manner, each discrete installment 304 of the unitary media program 202 is configured as a standalone unit for standalone playback in an individual playback session (e.g., an individual playback session dedicated exclusively to playback of the discrete installment 304). In this manner, a standalone unit of media such as a discrete installment 206 is configured for playback in an individual playback session.

Accordingly, the unitary media program 202 may be configured as a standalone unit for start-to-finish playback of the entire unitary media program 202 in an individual playback session, and each discrete installment 206 of the unitary media program 202 may be configured as a standalone unit for dedicated start-to-finish playback of the contiguous segment 304 contained in the discrete installment 206. In this respect, the unitary media program 202 may be configured to be processed as a standalone unit, and each discrete installment 206 of the unitary media program 202 may be configured to function as a standalone unit to be individually processed as a unit in media access operations.

Figure 4:
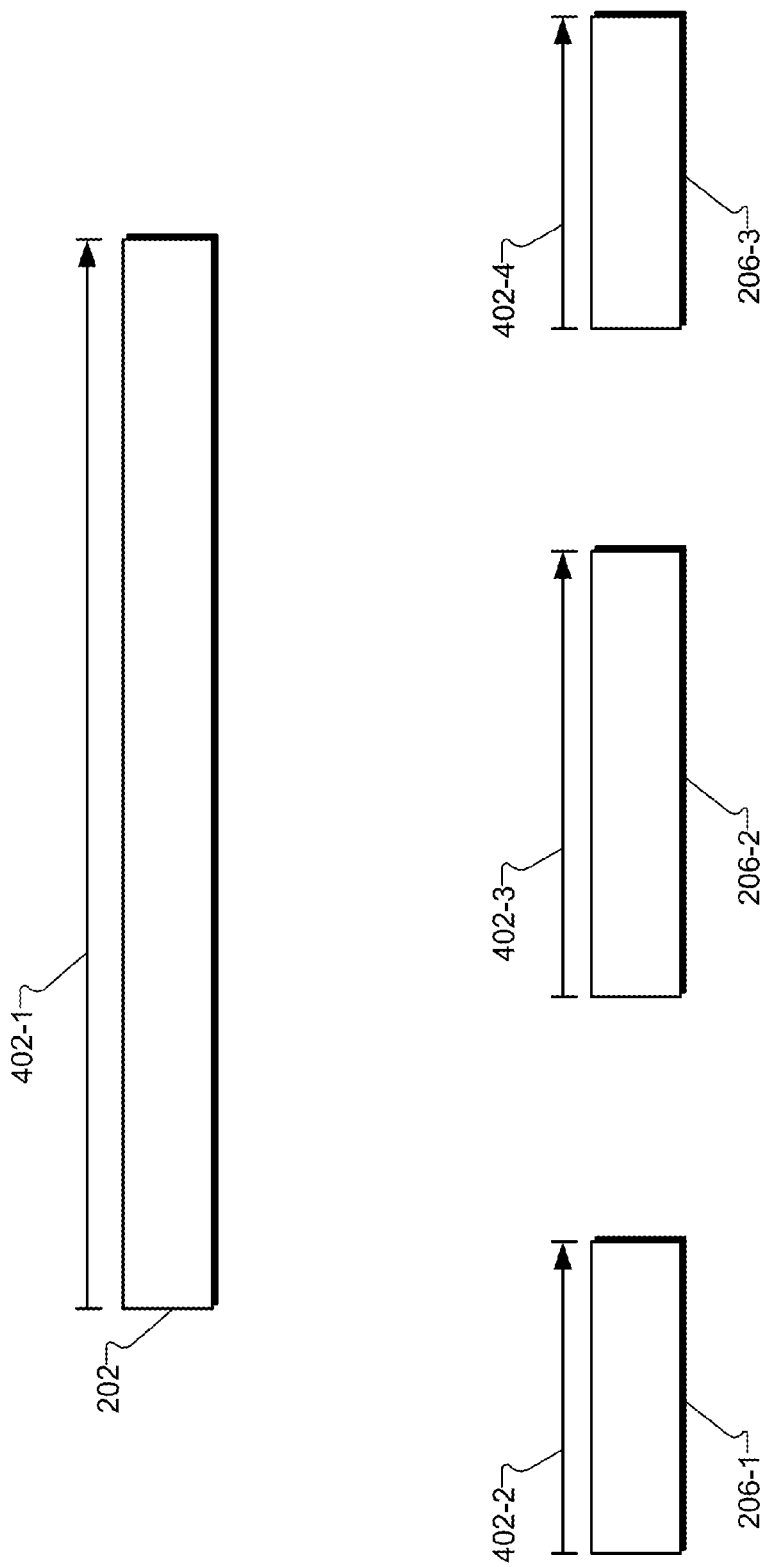
FIG. 4 illustrates relationships between playback sessions and a unitary media program and discrete installments of the unitary media program according to principles described herein.

To further illustrate the standalone configuration of the unitary media program 202 and each discrete installment 206 of the unitary media program 202, FIG. 4 shows relationships between discrete playback sessions 402 (e.g., playback sessions 402-1 through 402-4) and the unitary media program 202 and discrete installments 206 of the unitary media program 202. As shown, the unitary media program 202 may be configured for continuous, standalone playback in playback session 402-1. The discrete installments 206 may be configured for individual playback in multiple, separate playback sessions 402-2, 402-3, and 402-4. Specifically, discrete installment 206-1 may be configured for continuous, standalone playback in playback session 402-2, discrete installment 206-2 may be configured for continuous, standalone playback in playback session 402-3, and discrete installment 206-3 may be configured for continuous, standalone playback in playback session 402-4. Each playback session 402 may be launched to begin the playback session 402 and may be terminated to end of the playback session. Within a playback session, playback of media content may be manually stopped, paused, and resumed by a user within terminating the playback session.

In certain examples, the forming of a discrete installment 206 may include media management facility 102 adding supplementation content for inclusion together with the corresponding contiguous segment 304 in the discrete installment 206. For example, media management facility 102 may append supplemental content to at least one of a beginning and an end of the contiguous segment 304 contained in the discrete installment 206.

Figure 5:
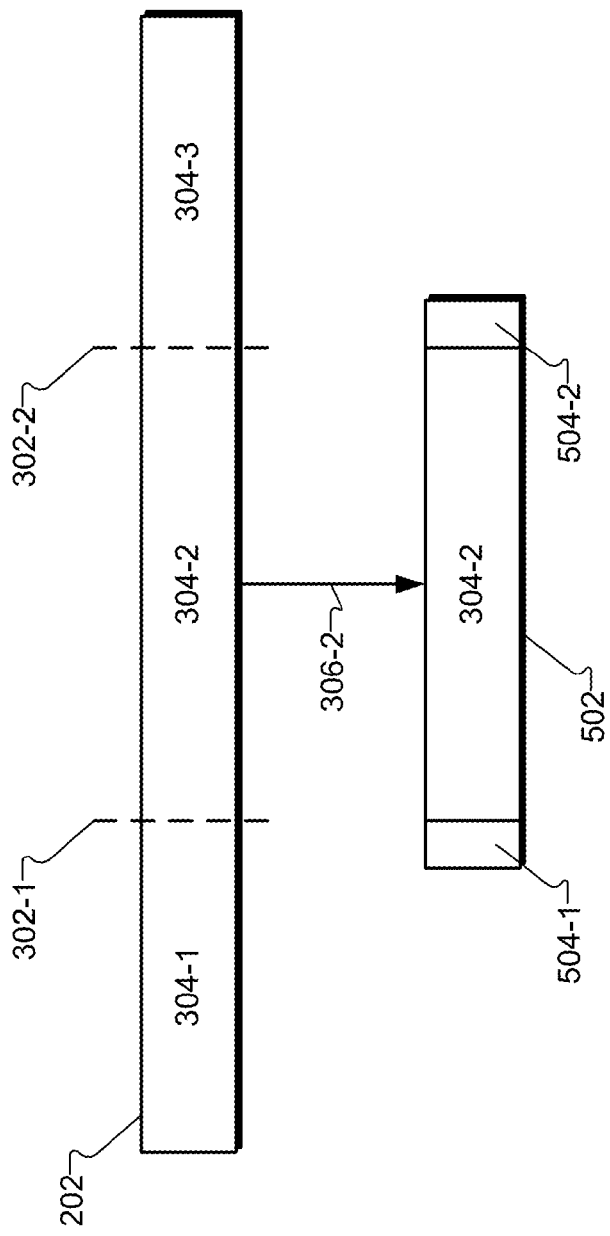
FIG. 5 illustrates an exemplary discrete installment that includes supplemental content appended to a contiguous segment of a unitary media program according to principles described herein.

FIG. 5 illustrates an example of a discrete installment 502 of the unitary media program 202. As shown, discrete installment 502 may include contiguous segment 304-2 of the unitary media program 202, supplement content 504-1 appended to the beginning of the contiguous segment 304-2, and supplement content 504-2 appended to the end of the contiguous segment 304-2. Discrete installment 502 may be configured as a standalone unit, such as described herein.

Supplemental content may include any media content that may be played back together with the contiguous segment 304-2 in a single playback session. For example, supplemental content may include, without limitation, advertisement content, introductory media content configured to be played back as an introduction to the contiguous segment 304-2, recap media content configured to be played back to provide a recap of a sequentially previous contiguous segment (e.g., contiguous segment 304-1), preview media content configured to be played back to provide a preview of a sequentially subsequent contiguous segment (e.g., contiguous segment 304-3), and any combination or sub-combination thereof.

Media management facility 102 may select supplemental content to be added to discrete installment 502 based on any suitable set of selection factors specified by the installment generation heuristic 204. The selection factors may be defined to promote selection of supplemental content that is relevant to the contiguous segment 304-2 contained in the discrete installment 502, relevant to other continuous segments 304-1 and/or 304-3 of the unitary media program 202, and/or potentially helpful and/or of interest to a user who consumes the discrete installment 502.

For example, the selection factors may indicate that the selection of supplemental content is to be based on, without limitation, community-favored scenes (e.g., popular scenes among users of the media service), time that a user has available or wants to spend watching each discrete installment (e.g., small, medium, large installments, or a maximum length of playback time for an installment, etc.), natural breaks in scenes in the unitary media program (e.g., scene changes), camera view switches in the unitary media program, predefined chapters in the unitary media program, relationships between discrete installments and/or contiguous segments of the unitary media program 202 (e.g., temporal positioning of content relative to a discrete installment and/or contiguous segment of the unitary media program 202), any other attribute(s) of the unitary media program 202 that may be used to select supplemental content, and/or any combination or sub-combination of such factors. Examples of selecting supplemental content based on one or more of these exemplary selection factors will now be described.

In certain examples, media management facility 102 may select supplemental content based on community-favored scenes of the unitary media program 202. For example, media management facility 102 may select one or more community-favored scenes of the unitary media program 202, as measured by user ratings of scenes within a community such as a community of end users of a media service, to add to the discrete installment 502. As an example, media management facility 102 may select one or more community-favored scenes from the contiguous segment 304-1 sequentially previous to contiguous segment 304-2 to be appended to the beginning of contiguous segment 304-2 in the discrete installment 502 to be played back to provide a recap of the subject matter of the sequentially previous contiguous segment 304-1. As another example, media management facility 102 may select one or more community-favored scenes from the contiguous segment 304-3 sequentially subsequent to contiguous segment 304-2 to be appended to the end of contiguous segment 304-2 in the discrete installment 502 to be played back to provide a preview of the subject matter of the sequentially subsequent contiguous segment 304-3.

In certain examples, media management facility 102 may select supplemental content based on a user-defined preferred length of a discrete installment of the unitary media program 202 (e.g., an amount of time that the user wants to spend watching a discrete installment). For example, the user may provide input indicating a preferred length of a discrete installment, and media management facility 102 may select supplemental content to add to the discrete installment based on how the playback length of the supplemental content will affect the total playback length of the discrete installment.

In certain examples, media management facility 102 may select supplemental content based on a natural break in a scene in the unitary media program 202. For example, media management facility 102 may select a start or stop point of supplemental content based on a natural break in a scene in the unitary media program 202.

In certain examples, media management facility 102 may select supplemental content based on a switch in camera view in the unitary media program 202. For example, media management facility 102 may select a start or stop point of supplemental content based on a change from one camera view to another camera view in the unitary media program 202.

In certain examples, media management facility 102 may select supplemental content based on predefined chapters in the unitary media program 202. For example, media management facility 102 may access and use chaptering information (e.g., chaptering information in media data 108) for the unitary media program 202 to select supplemental content from different chapters of the unitary media program 202.

In certain examples, media management facility 102 may select supplemental content based on relationships between discrete installments and/or contiguous segments of the unitary media program 202. For example, media management facility 102 may select supplemental content from contiguous segments that are temporally adjacent to the continuous segment 304-2 contained in the discrete installment 502 to which the supplemental content will be added. For instance, media management facility 102 may select supplemental content from contiguous segment 304-1 for inclusion in supplemental content 504-1 (e.g., as a recap of contiguous segment 304-1) and/or may select supplemental content from contiguous segment 304-3 for inclusion in supplemental content 504-2 of discrete installment 502 (e.g., as a preview of contiguous segment 304-3). In this manner, a recap may be played back to remind a user of previously consumed content, and a preview may be played back to help the user become interested or more interested in the next sequential content of the unitary media program 202.

In certain examples, media management facility 102 may select supplemental content to be added to discrete installment 502 based on user input indicating the supplemental content. For example, an end user or a provider of a media service may provide input to indicate specific supplemental content to be added to discrete installment 502. In response, media management facility 102 may select the supplemental content indicated by the user for addition to discrete installment 502.

Media management facility 102 may be configured to provide one or more tools for use by a user to define factors to be used by media management facility 102 to generate discrete installments of a unitary media program. For example, media management facility 102 may provide one or more tools in a user interface for use by the user to provide input to define such factors. This may allow the user to provide input for use by media management facility 102 to generate customized discrete installments of a unitary media program. For example, the user may define factors such as a preferred length of a discrete segment, whether a recap of a previous discrete installment of the unitary media program is to be included in a discrete segment, whether a preview of a subsequent discrete installment of the unitary media program is to be included in a discrete segment, other factors that may be used by media management facility 102 to generate discrete installments of a unitary media program, and/or any combination or sub-combination thereof.

In certain examples, media management facility 102 may be configured to provide user access to the unitary media program 202. For example, media management facility 102 may maintain data representative of the unitary media program 202 (e.g., in media data 108) and use the data to provide user access to the unitary media program 202, such as by streaming or downloading a digital copy of the unitary media program 202 to a user computing device associated with a user of a media service.

In addition or alternative to providing user access to the unitary media program 202, media management facility 102 may be configured to provide installment-by-installment user access to discrete installments (e.g., discrete installments 206 and/or 502) of the unitary media program 202. For example, media management facility 102 may maintain data representative of the discrete installments of the unitary media program 202 (e.g., in media data 108) and use the data to provide installment-by-installment user access to the discrete installments of the unitary media program 202, such as by individually streaming or downloading a digital copy of a discrete installment of the unitary media program 202 to a user computing device associated with a user of a media service.

Installment-by-installment access to discrete installments of the unitary media program 202 may facilitate installment-by-installment consumption, by an end user of the media service, of one or more of the discrete installments of the unitary media program 202. In certain examples, the end user may be able to individually choose any of the discrete installments to access and/or consume on-demand. In certain examples, media management facility 102 may release discrete installments of the unitary media program 202 in sequential order on-demand or over time, such as in accordance with a user-defined or provider-defined release schedule (e.g., daily, weekly, etc.) to facilitate serialized access to and/or consumption of the discrete installments of the unitary media program 202.

In certain examples, installment-by-installment access to discrete installments of the unitary media program 202 may facilitate installment-by-installment consumption of the unitary media program 202 in multiple, discrete playback sessions of the plurality of discrete installments. Such consumption may be a serialized consumption of the unitary media program 202 in discrete installments. For example, the end user of the media service may access and consume discrete installment 206-1 in a first playback session (e.g., on a first day), discrete installment 206-2 in a second playback session (e.g., on a second day), and discrete installment 206-3 in a third playback session (e.g., on a third day) to serially consume the unitary media program 202. Such access to discrete installments may be provided by media management facility 102 operating in a serialized-access mode.

In certain examples, media management facility 102 may be configured to provide, after termination of a playback session in which a discrete installment of a unitary media program is played back, a post-playback option selectable by a user to initiate playback of another discrete installment of the unitary media program or another (e.g., related) unitary media program. For example, after a discrete installment is played back, media management facility 102 may provide an option for selection by the user to launch another playback session to play back a next sequential discrete installment of a unitary media program or a discrete installment of another unitary media program related to the unitary media program.

As described herein, each discrete installment of the unitary media program 202 may be configured to be processed as a standalone unit in a media access operation, such as in any of the media access operations described herein.

Media management facility 102 may be configured to provide one or more tools for use by a user to define how discrete installments are distributed to the user. For example, media management facility 102 may provide one or more tools in a user interface for use by the user to provide input to define distribution factors to be used by media management facility 102 to distribute discrete installments to the user. For example, the user may define a distribution factor such as a preferred release time or schedule be followed by media management facility 102 to distribute (e.g., download, release, or otherwise make accessible) discrete installments of a unitary media program to the user.

In certain examples, media management facility 102 may be configured to provide an option for selection by an end user of a media service to access the unitary media program 202 by way of a normal-access mode or a serialized-access mode. The normal-access mode may be configured to facilitate a start-to-finish consumption of the unitary media program 202 in a single playback session of the unitary media program 202. Accordingly, in response to the normal-access mode being selected by the end user, media management facility 102 may provide access to the unitary media program 202 as a standalone unit.

The serialized-access mode may be configured to facilitate an installment-by-installment consumption of the unitary media program 202 in multiple, discrete playback sessions of discrete installments of the unitary media program 202. Accordingly, in response to the serialized-access mode being selected by the end user, media management facility 102 may provide access to the unitary media program 202 as discrete installments, with each discrete installment processed as a standalone unit.

Media management facility 102 may be configured to provide the user-selectable option to the end user in any suitable way, such as in a user interface associated with the media service. Examples of such an option in a user interface will now be described in reference to exemplary graphical user interface ("GUI") views. The exemplary options and GUI views are illustrative only. Other options may be included in other GUI views in other examples.

Figure 6:
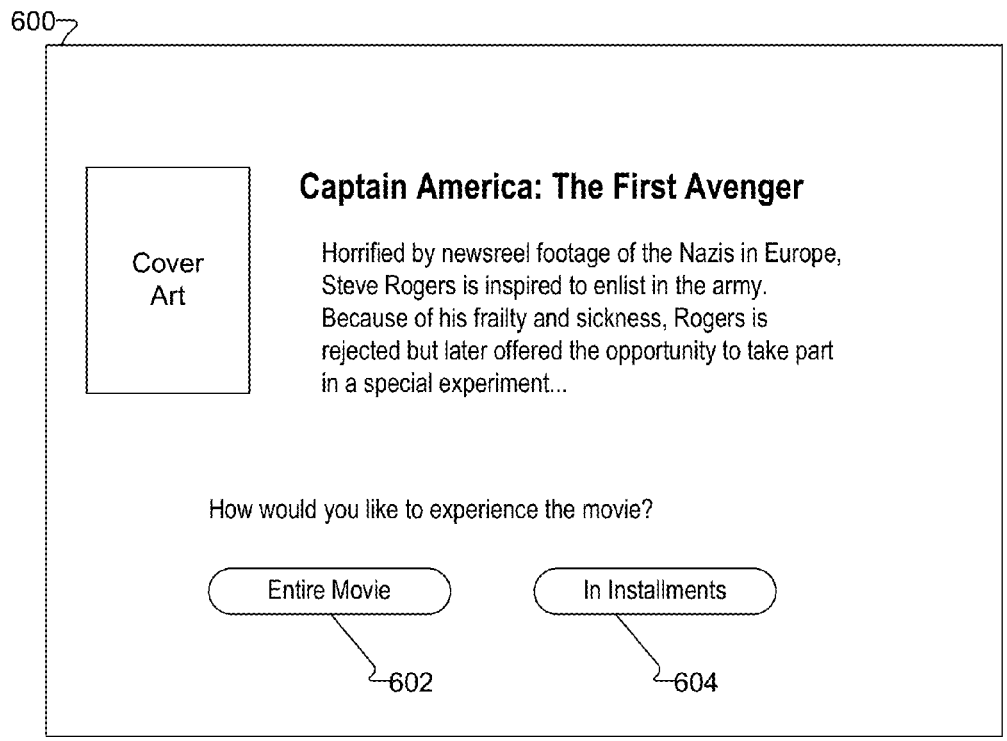
FIGS. 6-8 illustrate exemplary views of graphical user interfaces according to principles described herein.

FIG. 6 illustrates an access mode selection view 600 ("view 600") as may be displayed on a display screen associated with an end user of a media service and in which an option may be provided for selection by a user to access a media program by way of either a normal-access mode or an installment-access mode, which may be a serialized-access mode. As shown, view 600 may include user interface content related to a specific media program, such as a movie titled "Captain America: The First Avenger." View 600 may also include options for accessing the media program in either a normal-access mode or an installment-access mode. For example, view 600 may include an option 602 configured to be selected by a user to access the media program in a normal-access mode in which the entire media program may be accessed as a standalone unit, such as by playing back the entire media program in a playback session. In addition, view 600 may include an option 602 configured to be selected by the user to access the media program in an installment-access mode in which discrete installment of the media program may be accessed installment-by-installment as standalone units, such as by playing back the discrete installments in multiple, discrete playback sessions.

Figure 7:
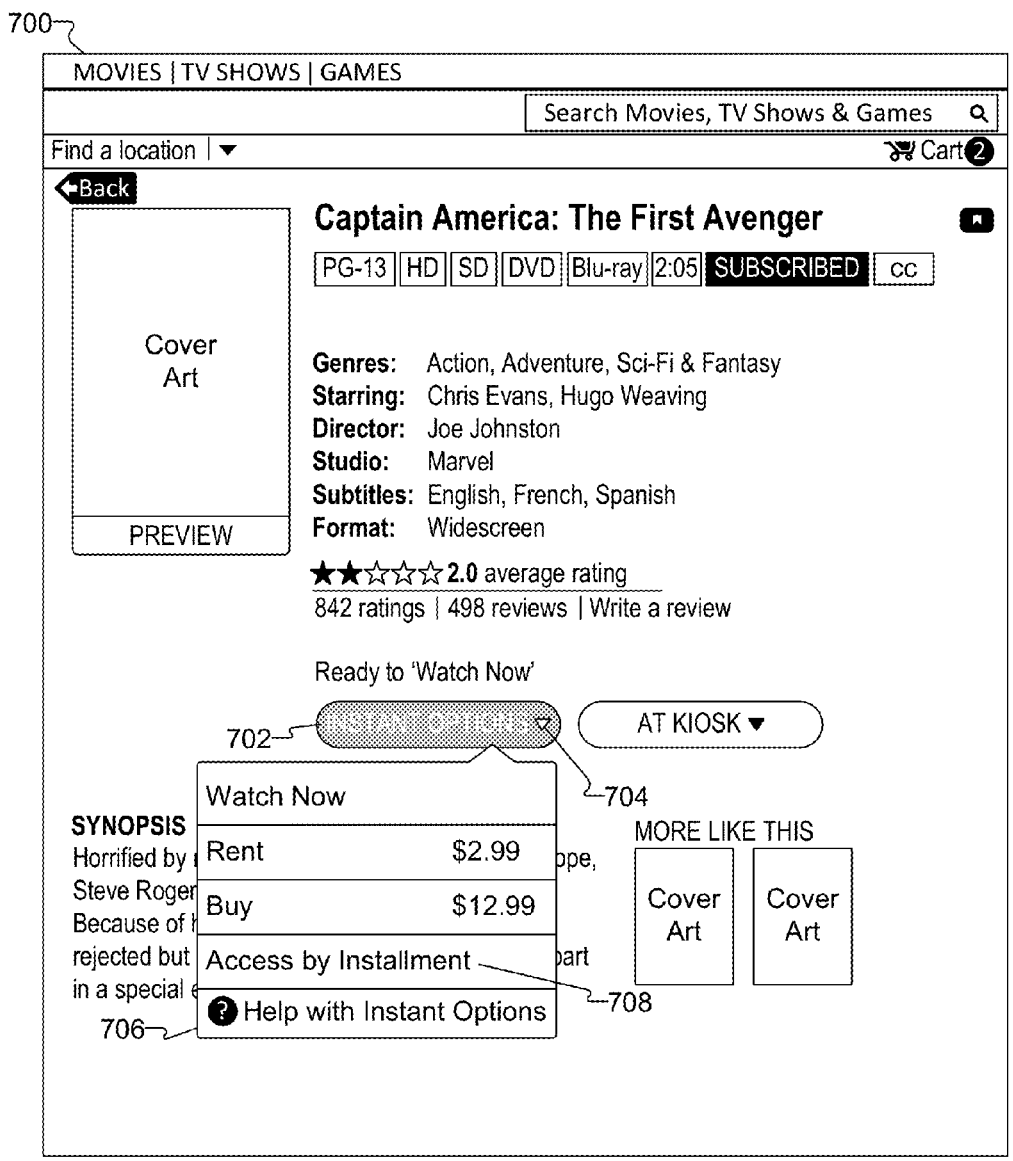

Media management facility 102 may provide view 600 in a user interface in any suitable context. For example, media management facility 102 may provide view 600 for display in response to a user request to access (e.g., download, stream, playback, etc.) the media program FIG. 7 illustrates a media service information view 700 ("information view 700") for a media program as may be displayed on a display screen associated with an end user of the media service. As shown, information view 700 may include user interface content related to a specific media program, including information about and options for accessing the media program.

Information view 700 may include an icon 702 representing a user selectable option to access one or more options for accessing a digital format of the media program on-demand. Icon 702 may include a visual indicator 704 indicative of an existence of a drop-down menu of such options that may be displayed in response to a user selection of icon 702 or visual indicator 704. In response to such a selection, a drop-down menu 706 may be displayed in information view 700, as shown in FIG. 7.

As shown, drop-down menu 706 may include user-selectable options for accessing the media program. For example, drop-down menu 706 may include one or more options for accessing the media program in accordance with a normal-access mode, such as a "Watch Now" option for selection by a user to access and play back the entire media program as a whole based on a subscription of the user to a media service, a "Rent" option for selection by the user to rent the media program as a whole in high definition format, and a "a purchase" option for selection by the user to rent the media program as a whole.

Additionally or alternatively, drop-down menu 706 may include one or more options for accessing the media program in accordance with an installment-access mode, such as an "Access by Installment" option 708 for selection by the user to access the media program by installment. In response to a user selection of option 708, media management facility 102 may perform one or more operations to provide or facilitate installment-by-installment access to discrete installments of the media program.

Figure 8:
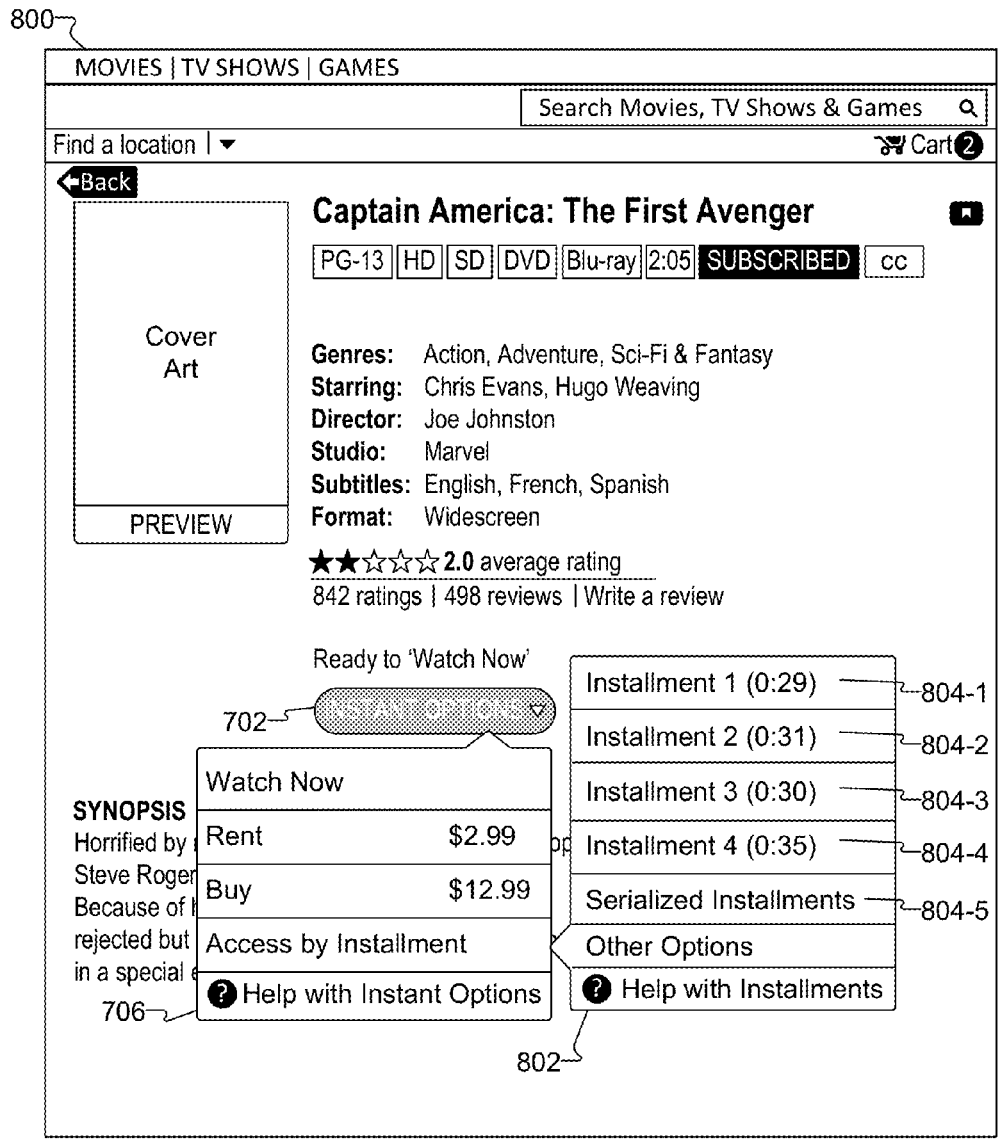

In certain examples, in response to a user selection of option 708, media management facility 102 may provide another pop-out menu that includes one or more options related to accessing discrete installments of the media program by installment. For example, FIG. 8 illustrates another information view 800 in which a pop-out menu 802 is displayed. As shown, pop-out menu 802 may include options 804 (e.g., options 804-1 through 804-5) for accessing discrete installments of the media program. For example, pop-out menu 802 may include option 804-1 for individually accessing a first installment of the media program, option 804-2 for individually accessing a second installment of the media program, option 804-3 for individually accessing a third installment of the media program, and option 804-4 for individually accessing a fourth installment of the media program. Each of the options 804-1 through 804-4 may visually indicate a playback duration and/or other information about the respective installment.

In addition, pop-out menu 802 may include option 804-5 for accessing discrete installments of the media program in accordance with a serialized-access mode. In response to a user selection of option 804-5, media management facility 102 may provide sequential installment-by-installment access to the installments of the media program in a serialized manner. In certain example, in response to a user selection of option 804-5, media management facility 102 may additionally or alternatively provide one or more tools for use by the user to configure the serialized access to the installments of the media program. For example, media management facility 102 may provide a tool for use by the user to configure a distribution schedule by which the installments will be serially distributed to and/or accessed by the user (e.g., on a daily basis).

Returning to FIG. 1, user interface facility 104 may be configured to perform one or more operations to provide one or more user interfaces associated with a media service. For example, user interface facility 104 may be configured to provide a user interface through which users of the media service may access and interface with the media service to discover, access, and consume media programs. The user interface may be in any suitable form. For example, user interface facility 104 may be configured to provide a website, a client application user interface (e.g., a user interface provided by a client application such as a "mobile app" installed and running on a user computing system), a media player user interface, a GUI, and/or any other form of user interface configured to facilitate interaction with the media service.

A user interface provided by user interface facility 104 may include any of the exemplary user interface views described herein. Media management facility 102 and user interface facility 104 may interact to generate and provide a user interface for presentation to a user. For example, media management facility 102 may provide user interface content, such as the examples of user interface content illustrated herein, to user interface facility 104 for inclusion in a GUI view to be provided (e.g., transmitted, rendered, and/or displayed) to a user by user interface facility 104.

System 100 may be embodied in any suitable implementation as may suit a particular application of principles described herein. To illustrated, examples of such implementations will now be described.

Figure 9:
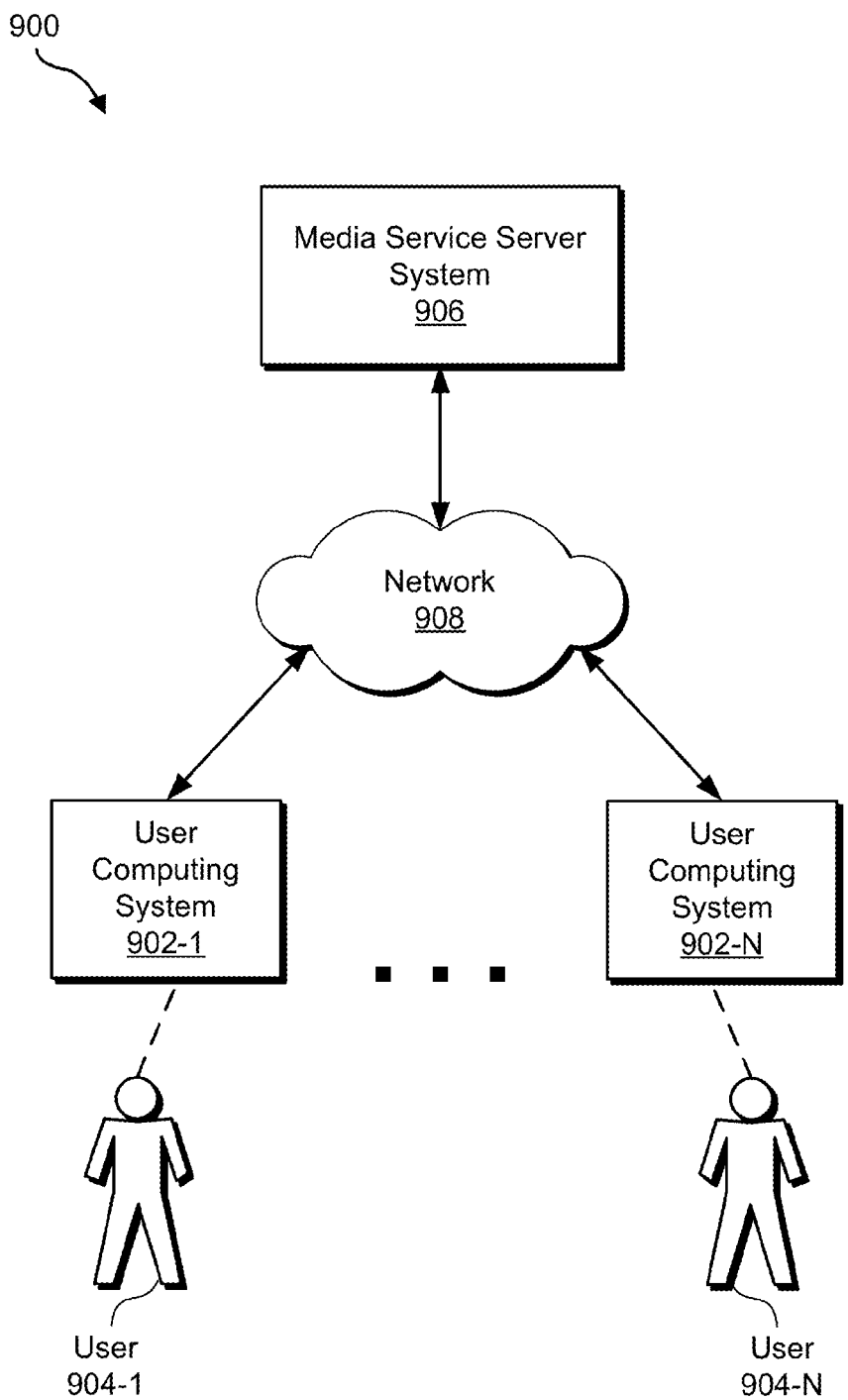
FIG. 9 illustrates an exemplary implementation of the system of FIG. 1 according to principles described herein.

FIG. 9 shows an exemplary implementation 900 of system 100. As shown, implementation 900 may include user computing systems 902 (e.g., user computing systems 902-1 through 902-N) respectively associated with users 904 (e.g., users 904-1 through 904-N), which may be end users of a media service provided by system 100. User computing systems 902 may be in communication with a media service server system 906 ("server system 906"), which may include one or more computing devices (e.g., server devices remotely located from user computing systems 902). In implementation 900, one or more of facilities 102-106 of system 100 may be implemented entirely by a user computing system 902, entirely by server system 906, or distributed across a user computing system 902 and server system 906 in any manner configured to facilitate a user 904 accessing the media service and/or media programs provided by system 100.

User computing systems 902 and server system 906 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 902 and server system 906 may communicate via a network 908. Network 908 may include one or more networks, such as one or more wireless networks (Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media programs) and/or communications signals between user computing systems 902 and server system 906. Communications between user computing systems 902 and server system 906 may be transported using any one of the above-listed networks, or any combination or sub-combination of the above-listed networks. Alternatively, user computing systems 902 and server system 906 may communicate in another way such as by direct connections between user computing systems 902 and server system 906.

Server system 906 may be configured to distribute media programs to user computing systems 902 for access and use by user computing systems 902 to present media programs for consumption by users 904. Server system 906 may distribute media programs to user computing systems 902 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 906 may be configured to stream media programs on-demand to user computing systems 902 by way of network 908.

In certain examples, server system 906 may be configured to provide one or more user interfaces for access by user computing systems 902. The user interfaces may be configured for use by users 904 to interact with the media service, including discovering and/or accessing media programs distributed by way of the media service. The user interfaces may include any of the exemplary user interface views described herein.

A user computing system 902 may be configured for use by a user 904 associated with (e.g., operating) the user computing system 902 to access the media service provided by system 100. For example, the user 904 may utilize the user computing system 902 to access one or more user interfaces provided by system 100 as part of the media service, and to present the user interfaces for use by the user 904 to discover, access, and/or consume media programs and/or discrete installments of media programs distributed by server system 906 as part of the media service.

A user computing system 902 may include one or more user computing devices associated with a user 904. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 902 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 902 may include any combination of user computing devices or a single user computing device configured to perform any of the user computing system and/or device operations described herein.

Figure 10:
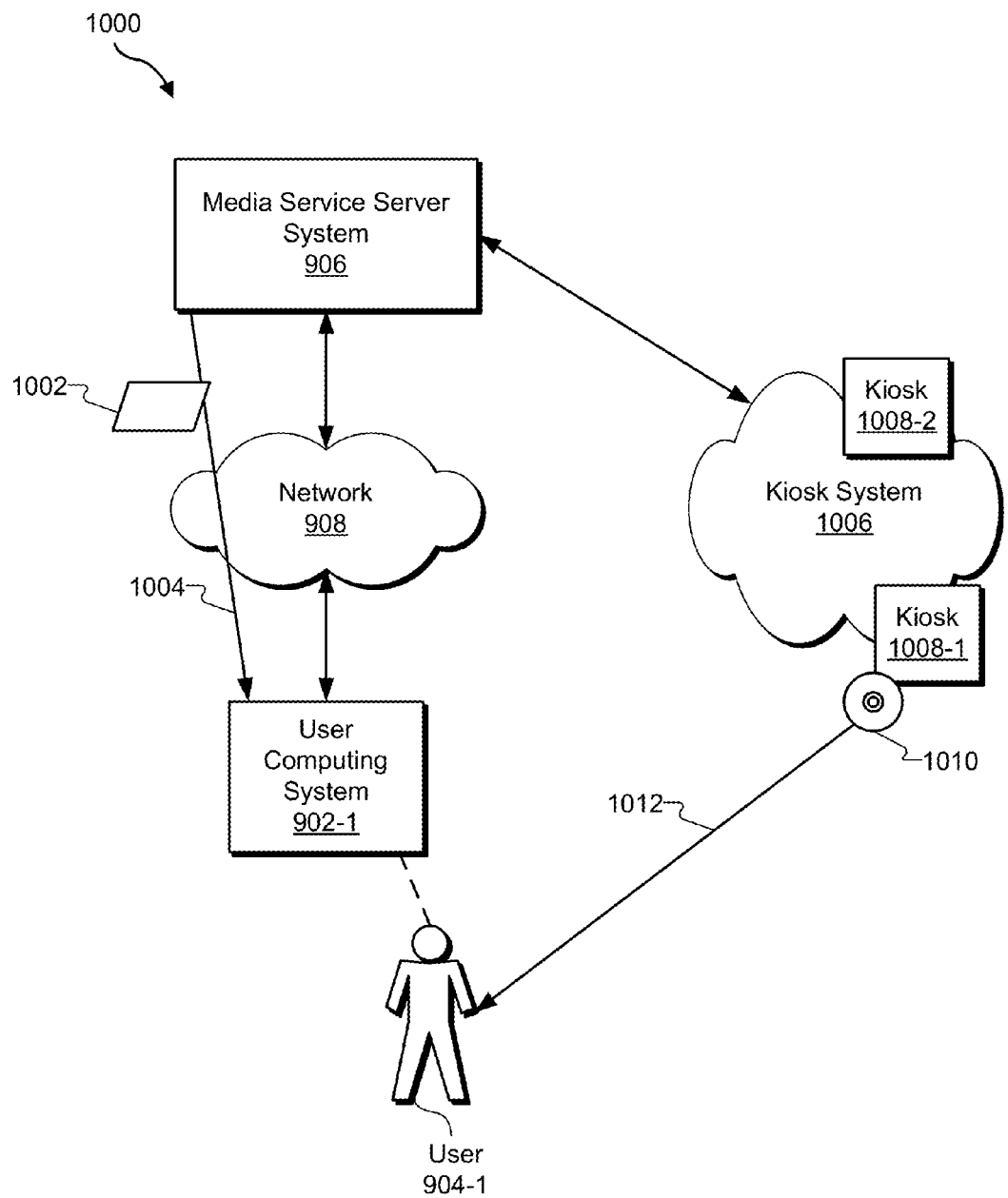
FIG. 10 illustrates another exemplary implementation of the system of FIG. 1 according to principles described herein.

FIG. 10 illustrates another exemplary implementation 1000 of system 100. Implementation 1000 is similar to implementation 900 and additionally utilizes an exemplary media distribution configuration to distribute media programs to end users of a media distribution service. The media distribution configuration may support distribution of media programs, through the media distribution service, by way of multiple different media distribution channels, such as a digital media distribution channel and a physical media distribution channel. As shown, server system 1006 may distribute media programs such as digital data 1002 representative of a media program to user computing system 902-1 by way of a digital media distribution channel 1004. This distribution may utilize any suitable media streaming and/or downloading technologies (e.g., Internet media streaming and/or downloading technologies) to support delivery of digital data representative of media programs to user computing system 902 by way of network 908.

As further shown in FIG. 10, server system 906 may be in communication with a media vending kiosk system 1006, which may include one or more geographically distributed vending kiosks 1008 (e.g., vending kiosks 1008-1 and 1008-2) configured to vend physical copies of media programs, such as a physical copy 1010 of a media program, to user 904-1 by way of a physical media distribution channel 1012. For example, user 904-1 may visit a location of media vending kiosk 1008-1 and obtain the physical copy 1010 of the media program from the media vending kiosk 1008-1. In certain examples, one or more of the vending kiosks 1008 may include automated media vending machines.

In certain examples, implementation 1000 may be configured to provide users of the media distribution service with access to media programs by way of a plurality of different media distribution models ("distribution models"). Each distribution model may define a particular way that an end user of the media distribution service may gain access to media programs through the media distribution service. Thus, a user of the media distribution service may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 1004 of FIG. 10, and a physical media distribution model may include or utilize the physical media distribution channel 1012 of FIG. 10.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media distribution service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 11:
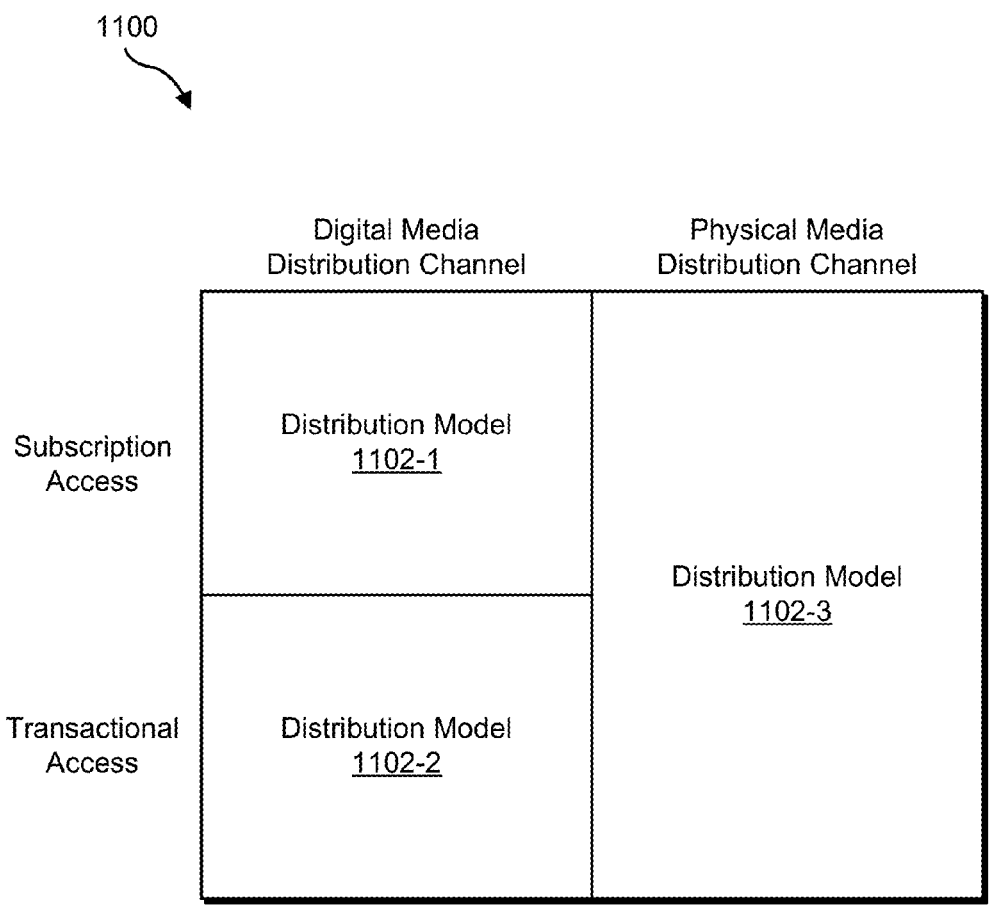
FIG. 11 illustrates a table representing an exemplary set of different media distribution models by way of which access to media programs may be provided by way of a media distribution service according to principles described herein.

Implementation 1000 may be configured to provide users of the media distribution service with access to media programs by way of any of the different distribution models described herein, or by way of any combination or sub-combination thereof. As an example, FIG. 11 illustrates a table 1100 representing a set of different distribution models by way of which access to media programs may be provided through the media distribution service in certain examples. As shown, the set of distribution models includes a first distribution model 1102-1 associated with subscription-based access to media programs by way of a digital media distribution channel, a second distribution model 1102-2 associated with transactional-based access to media programs by way of the digital media distribution channel, and a third distribution model 1102-3 associated with either or both subscription-based or transactional-based access to media programs by way of a physical media distribution channel. In certain examples, these distribution models 1102 may be referred to as a "subscription" digital distribution model 1102-1, an "on-demand" or "rent/buy" digital distribution model 1102-2, and a "physical" or "kiosk" distribution model 1102-3.

Media programs distributed by implementation 1000 as part of the media distribution service may be assigned (e.g., by a provider of the media distribution service) to one or more of the distribution models provided by implementation 1000. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 1102-3 only. At the end of that period of time, the media program may leave distribution model 1102-3, meaning that the media program is no longer accessible by way of distribution model 1102-3. For a second period of time, however, the same media program may be distributed by way of distribution model 1102-2 only. For example, when the media program leaves distribution model 1102-3, the media program may be added to distribution model 1102-2. At the end of the second period of time, the same media program may leave distribution model 1102-2 and be assigned to distribution model 1102-1. This example is illustrative only, a media program may be made accessible by way of different distribution models or specific combinations of distribution models for specific periods of time, and may be added to or removed from any distribution model in any suitable way.

Implementation 1000 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

In certain examples, media management facility 102 may use a library of on-demand media content associated with any of the on-demand media distribution models provided by implementation 1000, such as a digital subscription-based media distribution model and/or a digital transactional-based media distribution model provided by implementation 1000, to generate and/or maintain discrete installments of media programs in any of the ways described herein. In certain examples, media management facility 102 may provide installment-by-installment access to discrete installments of a media program in any of the ways described herein as part of the media distribution service provided by implementation 1000.

Figure 12:
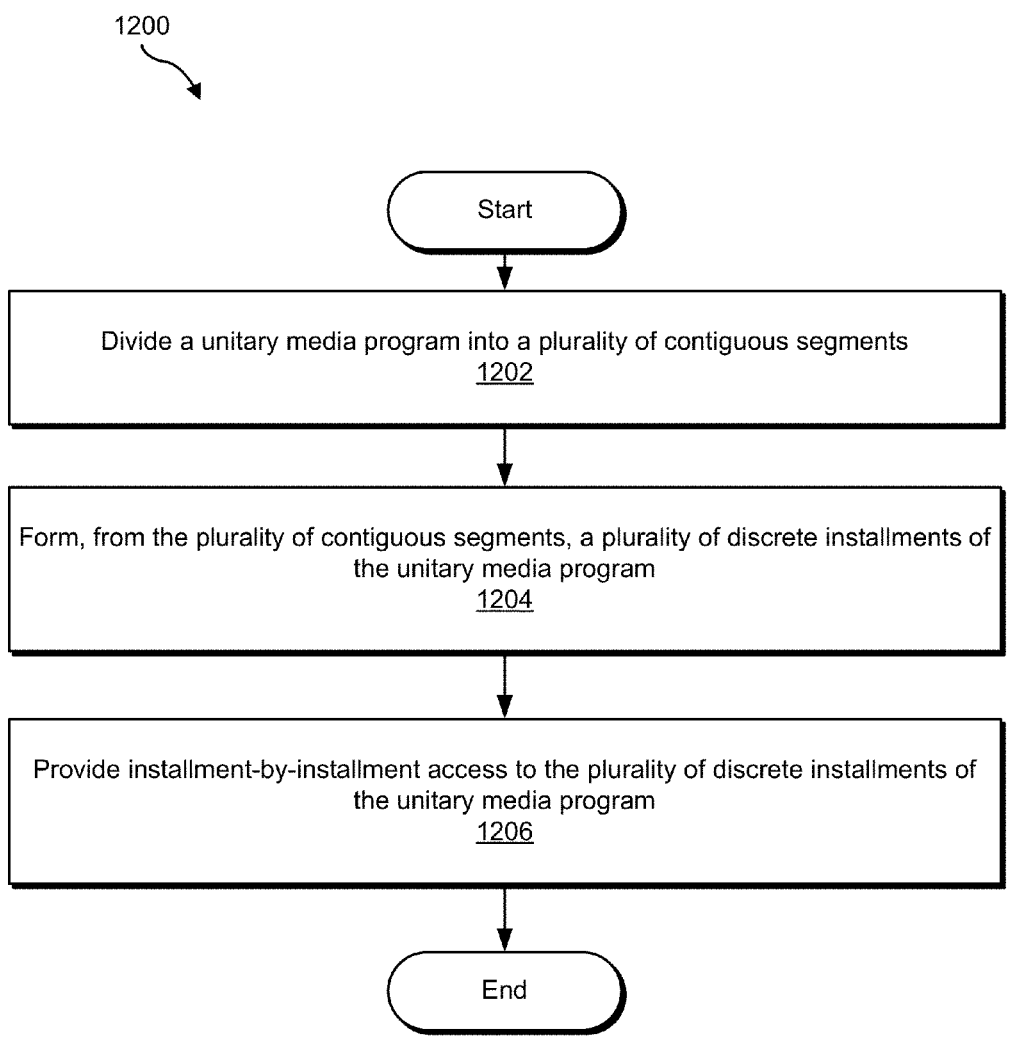
FIGS. 12-13 illustrate exemplary methods of facilitating installment-by-installment consumption of discrete installments of a unitary media program according to principles described herein.
Figure 13:
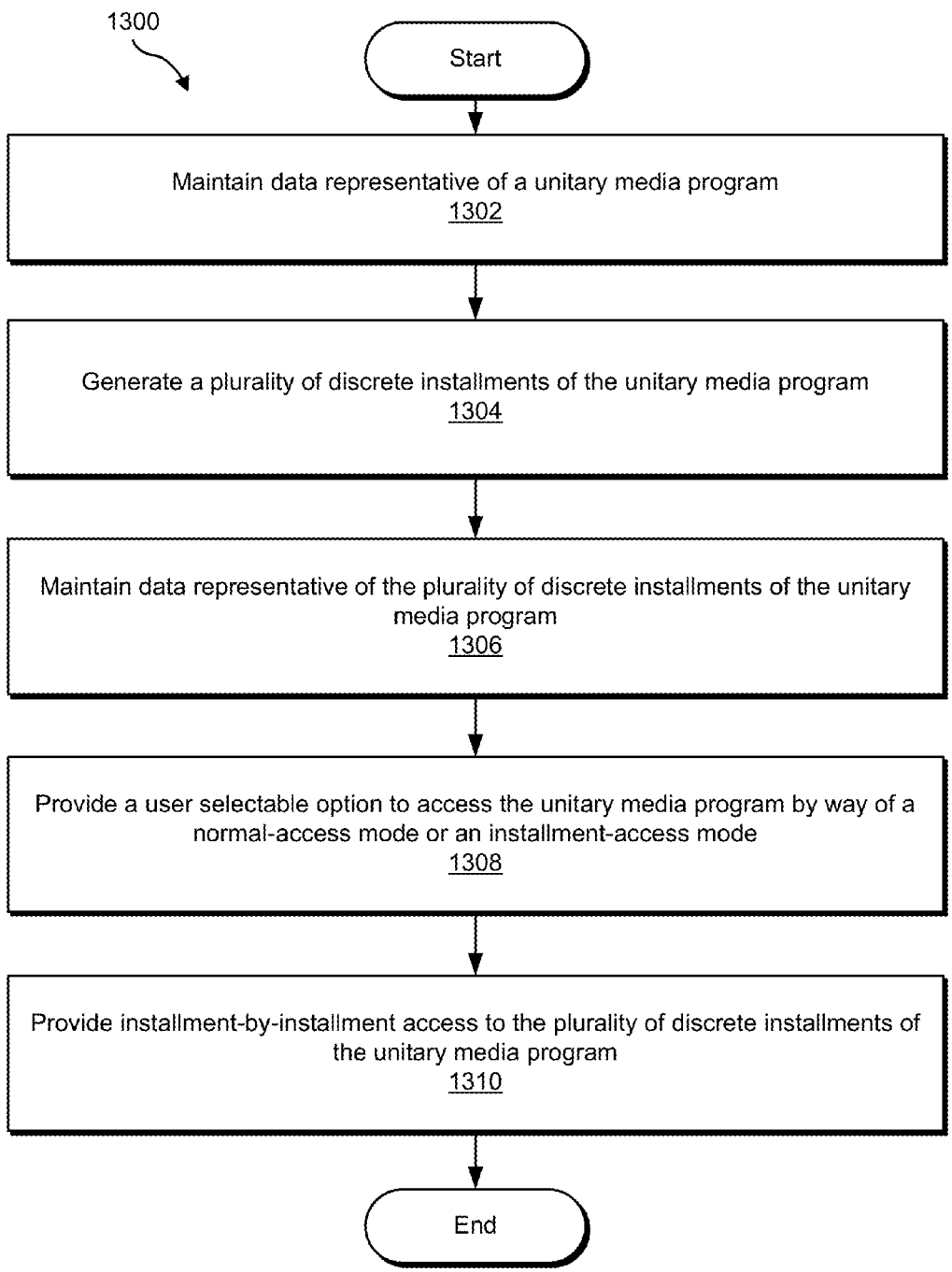

FIGS. 12-13 illustrate exemplary methods 1200 and 1300 of facilitating installment-by-installment consumption of discrete installments of a unitary media program according to principles described herein. While FIGS. 12-13 illustrate exemplary steps according to certain embodiments, other embodiments may omit, add to, reorder, combine, and/or modify any of the steps shown in FIGS. 12-13. In certain embodiments, one or more of the steps shown in FIGS. 12-13 may be performed by system 100 and/or one or more components or implementations of system 100.

Turning to the method 1200 illustrated in FIG. 12, in step 1202, a system (e.g., system 100) divides a unitary media program into a plurality of contiguous segments, such as described herein.

In step 1204, the system forms, from the plurality of contiguous segments, a plurality of discrete installments of the unitary media program, such as described herein. Each discrete installment may include a different contiguous segment and/or may be configured to be processed as a standalone unit in a media access operation, as described herein.

In step 1206, the system provides installment-by-installment access to the plurality of discrete installments of the unitary media program, such as described herein. For example, the system may provide serialized access to the discrete installments to facilitate serialized consumption of the unitary media program installment-by-installment, such as described herein.

Turning to the method 1300 illustrated in FIG. 13, in step 1302, a system (e.g., system 100) maintains data representative of a unitary media program. For example, system 100 may maintain such data in storage facility 106, as described herein.

In step 1304, the system generates a plurality of discrete installments of the unitary media program, such as described herein. For example, the system may divide the unitary media program into a plurality of contiguous segments and form, from the plurality of contiguous segments, the plurality of discrete installments of the unitary media program, such as described herein. Each discrete installment may include a different contiguous segment and/or may be configured to be processed as a standalone unit in a media access operation, as described herein.

In step 1306, the system maintains data representative of the plurality of discrete installments of the unitary media program. For example, system 100 may maintain such data in storage facility 106, as described herein.

In step 1308, the system provides a user selectable option to access the unitary media program by way of a normal-access mode or an installment-access mode, such as described herein. For example, the system may provide a user with an option configured to be selected by the user to access the unitary media program by way of an installment-access mode (e.g., a serialized-access mode), such as described herein.

In step 1310, the system provides installment-by-installment access to the plurality of discrete installments of the unitary media program, such as described herein. In certain examples, step 1310 may be performed in response to a user selection of an option to access the unitary media program by way of an installment-access mode.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 14:
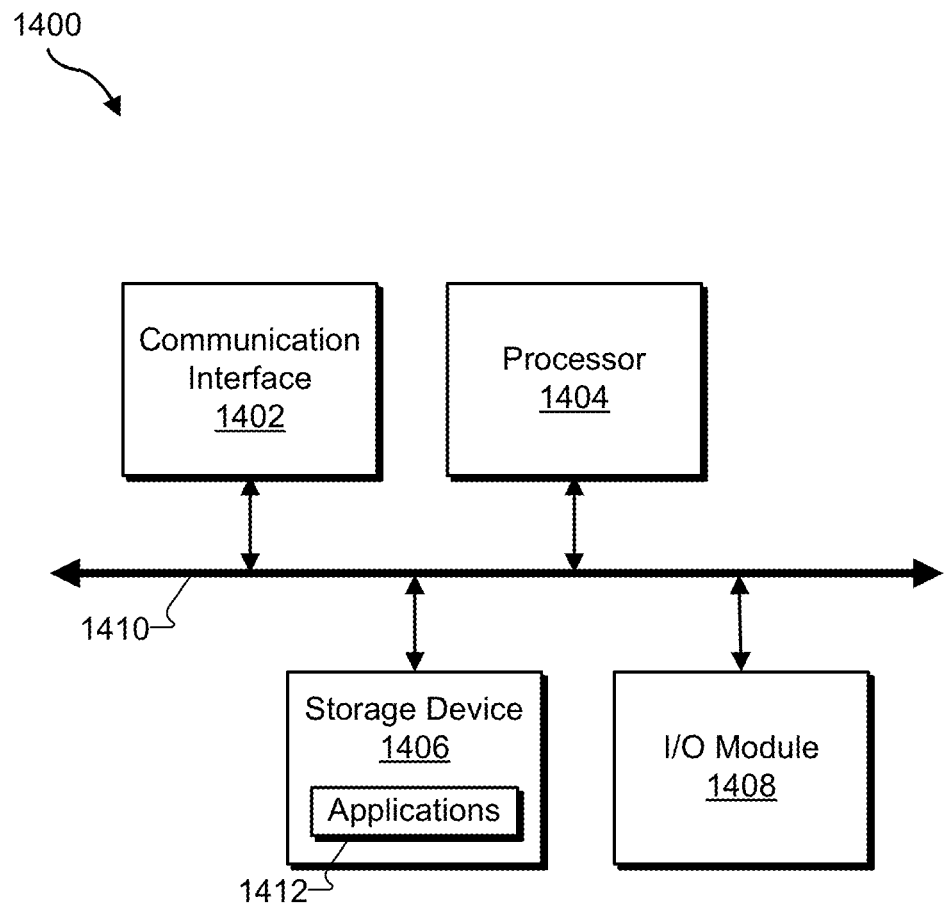
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional, fewer, or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1406. For example, data representative of one or more applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with media management facility 102 and/or user interface facility 104. Likewise, storage facility 106 may be implemented by or within storage device 1406. Such an implementation may be referred to as a computer-implemented system, such as a computer-implemented media service system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

To the extent the aforementioned embodiments may modify media programs and/or provide alternative ways for users to access and/or consume media programs, it should be understood that such operations shall be used in accordance with all applicable laws and/or agreements concerning protection of media programs and the rights of owners and/or distributors of media programs. One or more of the operations described herein may be subject to the consent and/or agreement of one or more entities, such as owners and/or distributors of media programs.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    dividing, by a computer-implemented media service system, a unitary media program into a plurality of contiguous segments;
    forming, by the computer-implemented media service system from the plurality of contiguous segments, a plurality of discrete installments of the unitary media program, each discrete installment in the plurality of discrete installments configured to be processed as a standalone unit in a media access operation, the forming of the plurality of discrete installments comprising selecting and appending, by the computer-implemented media service system based on one or more predefined selection factors, supplemental content to at least one of a beginning and an end of a contiguous segment included in the plurality of contiguous segments to form a discrete installment included in the plurality of discrete installments, the supplemental content comprising at least one of a recap of a sequentially previous contiguous segment included in the plurality of contiguous segments, and a preview of a sequentially subsequent contiguous segment included in the plurality of contiguous segments; and providing, by the computer-implemented media service system, an end user of a media service with installment-by-installment access to the plurality of discrete installments of the unitary media program;

wherein the selecting of the supplemental content based on the one or more predefined selection factors comprises selecting the supplemental content based on community-favored scenes in at least one of the sequentially previous contiguous segment and the sequentially subsequent contiguous segment of the unitary media program.

2. The method of claim 1, wherein the dividing of the unitary media program into the plurality of contiguous segments comprises:

identifying at least one division point within the unitary media program based on at least one division factor specified by an installment generation heuristic; and splitting the unitary media program at the identified at least one division point to divide the unitary media program into the plurality of contiguous segments.

3. The method of claim 2, wherein the at least one division factor indicates that the identifying of the at least one division point within the unitary media program is based on at least one of:

one or more community-favored scenes in the unitary media program;

a user-defined preferred length of the discrete installments of the unitary media program;

one or more natural breaks in scenes in the unitary media program;

one or more camera view switches in the unitary media program; and one or more predefined chapters in the unitary media program.

4. The method of claim 1, wherein the providing of the end user with the installment-by-installment access to the plurality of discrete installments of the unitary media program is configured to facilitate an installment-by-installment consumption of the unitary media program in multiple, discrete playback sessions of the plurality of discrete installments.

5. The method of claim 4, further comprising providing, by the computer-implemented media service system, an option for selection by the end user to access the unitary media program by way of a normal-access mode or a serialized-access mode;

the normal-access mode configured to facilitate a start-to-finish consumption of the unitary media program in a single playback session of the unitary media program, and the serialized-access mode configured to facilitate the installment-by-installment consumption of the unitary media program in the multiple, discrete playback sessions of the plurality of discrete installments.

6. The method of claim 5, wherein the providing of the end user with the installment-by-installment access to the plurality of discrete installments of the unitary media program is performed in response to a selection by the end user to access the unitary media program by way of the serialized-access mode.

7. The method of claim 1, embodied as computer-executable instructions on at least one non-transitory computer-readable medium.

8. The method of claim 1, wherein the selecting of the supplemental content based on the one or more predefined selection factors further comprises selecting the supplemental content based on a user-defined preferred length of the discrete installments of the unitary media program.

9. The method of claim 1, wherein the dividing of the unitary media program into the plurality of contiguous segments comprises identifying the plurality of contiguous segments based on a user-defined preferred length of the discrete installments of the unitary media program.

10. The method of claim 1, wherein the dividing of the unitary media program into the plurality of contiguous segments comprises identifying the plurality of contiguous segments based on at least one division factor other than predefined chapters in the unitary media program.

11. A method comprising:

maintaining, by a computer-implemented media service system, data representative of a unitary media program;

generating, by the computer-implemented media service system, a plurality of discrete installments from the unitary media program by dividing the unitary media program into a plurality of different contiguous segments and forming, from the plurality of the different contiguous segments, the plurality of discrete installments of the unitary media program, the forming of the plurality of discrete installments comprising selecting and appending supplemental content to a beginning of a contiguous segment included in the plurality of the different contiguous segments to form a discrete installment included in the plurality of discrete installments, the supplemental content comprising a recap of a sequentially previous contiguous segment included in the plurality of the different contiguous segments, the selecting of the supplemental content based on community-favored scenes in the sequentially previous contiguous segment included in the plurality of the different contiguous segments;

maintaining, by the computer-implemented media service system, data representative of the plurality of discrete installments of the unitary media program, each discrete installment in the plurality of discrete installments configured to be processed as a standalone unit in a media access operation; and providing, by the computer-implemented media service system, a user selectable option to access the unitary media program by way of a normal-access mode or a serialized-access mode, the normal-access mode configured to facilitate a start-to-finish consumption of the unitary media program in a single playback session of the unitary media program, and the serialized-installment-access mode configured to facilitate an installment-by-installment consumption of the unitary media program in multiple discrete playback sessions of the plurality of discrete installments.

12. The method of claim 11, wherein the forming of the plurality of discrete installments further comprises appending additional supplemental content to an end of the contiguous segment included in the plurality of the different contiguous segments to form the discrete installment included in the plurality of discrete installments, the additional supplemental content comprising
a preview of a sequentially subsequent contiguous segment included in the plurality of the different contiguous segments.

13. The method of claim 11, embodied as computer-executable instructions on at least one non-transitory computer-readable medium.

14. A system comprising:
at least one physical computing device that:
divides a unitary media program into a plurality of contiguous segments;
forms, from the plurality of contiguous segments, a plurality of discrete installments of the unitary media program, each discrete installment in the plurality of discrete installments configured to be processed as a standalone unit in a media access operation, wherein the at least one physical computing device forms the plurality of discrete installments by selecting and appending, based on one or more predefined selection factors, supplemental content to at least one of a beginning and an end of a contiguous segment included in the plurality of contiguous segments to form a discrete installment included in the plurality of discrete installments, the supplemental content comprising at least one of
a recap of a sequentially previous contiguous segment included in the plurality of contiguous segments, and
a preview of a sequentially subsequent contiguous segment included in the plurality of contiguous segments; and
provides an end user of a media service with installment-by-installment access to the plurality of discrete installments of the unitary media program;
wherein the selecting of the supplemental content based on the one or more predefined selection factors comprises selecting the supplemental content based on community-favored scenes in at least one of the sequentially previous contiguous segment and the sequentially subsequent contiguous segment of the unitary media program.

15. The system of claim 14, wherein the at least one physical computing device divides the unitary media program into the plurality of contiguous segments by:
identifying at least one division point within the unitary media program based on at least one division factor specified by an installment generation heuristic; and
splitting the unitary media program at the identified at least one division point to divide the unitary media program into the plurality of contiguous segments.

16. The system of claim 15, wherein the at least one division factor indicates that the identifying of the at least one division point within the unitary media program is based on at least one of:
one or more community-favored scenes in the unitary media program;
a user-defined preferred length of the discrete installments of the unitary media program;
one or more natural breaks in scenes in the unitary media program;
one or more camera view switches in the unitary media program; and
one or more predefined chapters in the unitary media program.

17. The system of claim 14, wherein the at least one physical computing device provides the end user with the installment-by-installment access to the plurality of discrete installments of the unitary media program by providing sequential installment-by-installment access to the plurality of discrete installments for playback in multiple, discrete playback sessions of the plurality of discrete installments.

18. The system of claim 17, wherein the at least one physical computing device provides an option for selection by the end user to access the unitary media program by way of a normal-access mode or a serialized-access mode;
the normal-access mode configured to facilitate a start-to-finish consumption of the unitary media program in a single playback session of the unitary media program, and
the serialized-access mode configured to facilitate sequential installment-by-installment access to the plurality of discrete installments of the unitary media program for playback in multiple, discrete playback sessions of the plurality of discrete installments.

19. The system of claim 14, wherein the at least one physical computing device selects the supplemental content based on the one or more predefined selection factors at least in part by selecting the supplemental content based on a user-defined preferred length of the discrete installments of the unitary media program.

20. The system of claim 14, wherein the at least one physical computing device divides the unitary media program into the plurality of contiguous segments at least in part by identifying the plurality of contiguous segments based on a user-defined preferred length of the discrete installments of the unitary media program.

21. The system of claim 14, wherein the at least one physical computing device divides the unitary media program into the plurality of contiguous segments by identifying the plurality of contiguous segments based on at least one division factor other than predefined chapters in the unitary media program.

* * * * *